United States Patent Office 3,522,187
Patented July 28, 1970

3,522,187
HYDROUS OXIDE CATION EXCHANGERS
Kurt A. Kraus, Oak Ridge, Tenn., assignor of one-third each to James S. Johnson, Jr., and Harold O. Phillips, both of Oak Ridge, Tenn.
No Drawing. Application Jan. 28, 1965, Ser. No. 428,850, now Patent No. 3,382,034, which is a division of application Ser. No. 141,291, Sept. 28, 1961, which in turn is a continuation of application Ser. No. 631,065, Dec. 28, 1956. Divided and this application June 5, 1967, Ser. No. 655,702
Int. Cl. C09k 3/00
U.S. Cl. 252—182                                6 Claims

ABSTRACT OF THE DISCLOSURE

Hydrous oxide cation exchangers containing a basic hydrous oxide and a non-siliceous acidic hydrous oxide, at least one of the hydrous oxides containing an element with an atomic number greater than 20 and preparation thereof.

---

This application is a division of my copending application Ser. No. 428,850, filed Jan. 28, 1965, and now Pat. No. 3,382,034, which in turn is a division of Ser. No. 141,291, filed Sept. 28, 1961, which in turn is a continuation of Ser. No. 631,065, filed Dec. 28, 1956.

This invention relates to ion exchange, particularly the concentration, isolation, recovery and/or separation of inorganic ions with certain hydrous oxide ion exchangers.

Adsorption and ion exchange processes have been used widely for concentration, isolation and separation of various materials. Adsorbents or ion exchangers which have been used most extensively are silicates, such as clays, zeolites, glauconites, etc., and organic resinous exchangers. However, the materials currently known as adsorbents or ion exchangers have many disadvantages and many of the processes in which they may be employed are too tedious or cumbersome to be of proper commercial value. Most of the present ion exchange materials have too low selectivity for many purposes, which entails the use of long columns of ion exchanger to obtain significant separation.

The present siliceous ion exchangers have very poor stability in both acidic and basic solutions and, consequently, their use in making ionic separations is severely limited to substantially neutral solutions.

The organic resinous exchangers have good stability in contact with strong acids, and some also with strong bases, but they generally have low stability to oxidizing solutions, strong nuclear radiation fields and high temperatures and poor selectivity for ions of the same charge type.

Other inorganic adsorbents which have been proposed or used include aluminum oxide, bone char and calcium phosphate. Hydrous oxides, such as ferric oxide, tin oxide and zirconium oxide, have been shown to have some adsorptive properties. However, these materials have almost invariably been used either in preparations wherein the respective physical characteristics are such that they have relatively low ion capacity or where relatively low selectivity between ions of similar charge existed and, furthermore, they have generally been considered as unsuitable for subsequent ion recovery therefrom.

The principal object of the present invention is to provide an effective method for the concentration, isolation, separation and recovery of inorganic ions from mixtures thereof using certain hydrous oxide ion exchangers.

Another object of this invention is to provide a method which may be specifically adjusted to separate and recover groups of elements from aqueous solutions containing other groups of elements, to separate and recover individual elements from aqueous solutions containing two or more elements of a single group, and to concentrate and recover certain elements from aqueous solutions wherein they occur as contaminants or physiologically toxic materials.

A further object of this invention is to provide a process employing certain hydrous oxides which are acid and base stable, oxidation and reduction stable, stable in the presence of radiations from radioactive ions in the aqueous solutions used, and temperature stable over the range of temperatures required for separation and recovery of the respective ion species.

Still another object of this invention is to provide a process employing certain hydrous oxides capable of rapidly and selectively separating and recovering ions from aqueous solutions, particularly where groups of such ions are of the same charge type, thereby requiring the use of not only smaller amounts of ion exchangers but shorter columns of such ion exchangers than has hitherto been possible.

A still further object of the present invention is to provide a process wherein a series of ion separations and recoveries can be made from a single aqueous solution by a sequence of hydrous oxide ion exchanger contacts without changing solutions between such contacts.

Another object of the present invention is to provide processes for preparation of improved ion exchangers, including methods of stabilizing otherwise unstable ion exchange materials, and the products obtained through such processes.

In addition, the process of the present invention provides a method for separation, recovery and purification in the processing of ore concentrates in the production of some of the more valuable metals, such as rubidium, cesium, radium, rare earths, thorium, molybdenum, tungsten, uranium, cobalt, copper and silver.

Other objects of the invention include the provision for the economical concentration, isolation, recovery and/or separation of inorganic ions both from the standpoint that the hydrous oxide ion exchangers are much less expensive than the organic resinous exchange materials which are most commonly used, and that their greater capacity for sharp and selective ion exchange results in less ion exchanger and less expensive apparatus being needed for any stated separation and recovery.

I have discovered an efficient and economical method for separating inorganic material from an aqueous ion supply of such material by providing a hydrous oxide ion exchanger containing the hydrous oxide of at least one element with atomic number greater than 20 which is substantially insoluble in the aqueous solution ion supply and which has a sufficient amount of exchangeable ions of the same charge sign as the ions being separated from said solution, by contacting the aqueous solution with a sufficient amount of the hydrous oxide ion exchanger for a sufficient time to separate the desired amount of ions from the solution thereby producing ion exchanger enriched with said ions, by separating the enriched ion exchanger from the depleted aqueous solution which still holds the remaining ions from which the selected ions have been separated, by contacting the enriched ion exchanger with an aqueous solution of a reagent capable of supplying ions which will displace the ions enriched on the ion exchanger into this contacting solution, and by separating the denuded ion exchanger and the aqueous solution enriched with ions which have been separated and thereby finally recovered in the latter solution.

Certain words and phrases used in the description and claims have the meanings and interpretations which follow.

"Ion exchangers" are materials which contain a network or matrix to which are fixed either negative or positive charges. In order to preserve neutrality, these solids must contain either mobile or displaceable ions of opposite charge (counter ions). If the network contains a negative charge, the displaceable ions will be positively charged and the material is known as a cation exchanger. Conversely, for a positively charged network, the displaceable ions are negatively charged and the material is known as an anion exchanger.

"Hydrous oxide ion exchangers" are amorphous or microcrystalline solids containing one or more metal cations (normally not exchanged), oxide anions, hydroxide anions, varying amounts of water, and some other exchangeable ions (anions or cations, depending upon the charge of the specific ion or group of ions being separated and recovered). Although such materials may have been identified heretofore as a particular "oxide" or "salt," it is to be understood that any such oxides or salts as may be mentioned herein do not necessarily and, in fact, often do not have a simple and/or definite stoichiometrical composition and often do not have a definite crystal structure when examined with X-rays (as frequently implied when a material is identified as an oxide or a salt).

The hydrous oxide ion exchangers of the present invention may be essentially oxides or hydroxides of a single element or a mixture of oxides of two or more elements. In the latter case, the solid mixture may be of relatively uniform composition, such as may be obtained as the result of a specific co-precipitation, or may be definitely non-uniform, such as may be obtained as a result of adsorption of one oxidic material on another previously prepared oxide support. In any event, the hydrous oxide ion exchanger used for the separations described herein must be substantially insoluble in the aqueous solution ion supply with which it is being contacted, whether such aqueous solution be acidic, neutral or basic.

The charge on a hydrous oxide species depends largely upon the degree of acidity of the oxide and the media. If the hydrous oxides are very basic, they may exist as cations at all pH values and thus they have only anion exchange properties; conversely, if they are highly acidic, they exist only as negatively charged species, and will be usable only as cation exchangers. Hydrous oxides of intermediate acidity characteristics exist and have either anion or cation exchange properties, depending upon the nature of the aqueous medium with which they are in contact. In general, for a given hydrous oxide, other conditions being the same, the more acidic solution will promote anion exchange behavior and the more basic solution will promote cation exchange behavior. Under certain conditions, both anions and cations, e.g., neutral salts, are adsorbed. It must be emphasized that the solution acidity at which this occurs is dependent not only upon the hydrous oxide in question but the other ions present in the system.

The hydrous oxides of many elements, which theoretically would be useful ion exchangers are dispersible, that is, they are sufficiently soluble or otherwise unstable in the aqueous solutions with which they must come in contact to reduce their effectiveness or to preclude their use entirely. This difficulty has been overcome by the stabilization of such unstable hydrous oxides. This stabilization has been obtained in at least two ways.

In one method of stabilization, the unstable hydrous oxide has been adsorbed on a stable hydrous oxide at a pH sufficiently low to cause such adsorption. The stable hydrous oxide then behaves as an anion exchanger for the unstable hydrous oxide. The resulting solid, insoluble ion exchanger thereby attains an excess of fixed negative charges and becomes a cation exchanger.

In another method of stabiliaztion, substantially the same result has been obtained by co-precipitation of the normally stable hydrous oxide and the normally unstable or soluble hydrous oxide from solutions of salts of the respective elements. However, it must be understood that even though the resulting product may be considered loosely as being a precipitated metal salt, actually under these circumstances the exchange materials, as produced thereby, must be considered as mixtures of hydrous oxides, since generally the respective oxides may be present in the hydrous oxide ion exchanger in other than stoichiometrical proportions.

While this second method for stabilization ordinarily involves precipitation from salt solutions where one of the elements for the product is a cation in the salt solution from which it is derived and another element is the anion of the salt solution from which it is derived, the same general procedure has been used to make other mixed hydrous oxide ion exchangers where both, or all, the elements were cations in the salt solutions from which they were derived.

The methods for preparation of hydrous oxide ion exchangers typical of those used in the present invention are presented in the examples below.

EXAMPLE 1

Hydrous titanium oxide ion exchanger (a) The preparation of hydrous titanium oxide from soluble titanium salts is more complicated than that for many other hydrous oxides because of the fact that the simple salts of Ti(IV) are not soluble even in concentrated mineral acids. One method of preparation consisted in adding an excess of about 1 M ammonium hydroxide to a solution of $TiCl_3$. The resulting precipitate oxidized rapidly in air to a hydrous oxide of Ti(IV), which was then washed with water, dried, ground and sized.

(b) It is generally not necessary to prepare such a hydrous oxide from originally soluble components. Thus, commercial titanium nitrate, which is normally not soluble in water or dilute acids presumably because it is already an insoluble basic salt, was treated with an excess of ammonia, the solid hydrous oxide filtered out, dried, ground and sized for column use.

EXAMPLE 2

Hydrous oxide ion exchanger containing oxides of titanium and phosphorus

A $TiCl_3$ solution was oxidized to Ti(IV) with an excess of $H_2O_2$ and $H_3PO_4$ solution added thereto. Since no precipitate formed on the addition of the $H_3PO_4$, the pH of the solution was increased by adding $Na_3PO_4$ until no further precipitate formed. The final pH of the solution was 6.1. The resultant precipitate was filtered out, washed, dried and sized. Subsequently, this material showed a high capacity for $Cs^+$ ions.

EXAMPLE 3

Hydrous zirconium oxide ion exchanger

An excess of 2 M $NH_4OH$ was added with stirring to a 1 M solution of zirconium oxychloride. The resultant precipitate was filtered out, washed, dried, ground and screened for column use.

EXAMPLE 4

Hydrous oxide ion exchanger containing oxides of zirconium and phosphorus (a) About 1 M $H_3PO_4$ was added in excess to a 1 M solution of zirconium oxychloride and the resultant gelatinous precipitate was filtered out, washed, dried, ground and sized.

(b) A good handling ion exchanger with excellent properties has also been prepared by adding an excess of 1 M $H_3PO_4$ to an aqueous solution of 1 M zirconium oxychloride and 0.5 M KCl. The precipitate was filtered out, washed, dried and sized.

As in the case of the hydrous zirconium oxide ion exchanger, the drying temperature is usually not critical;

however, a serious decrease in ion capacity occurred if the drying temperature was above 300° C.

EXAMPLE 5

Hydrous oxide ion exchanger containing oxides of zirconium and tungsten (a) Approximately 0.5 M solutions of zirconium oxychloride and sodium tungstate were adjusted to pH ca. 1 by addition of HCl to the tungstate and, if necessary, $NH_4OH$ to the zirconium solution. These solutions were mixed so that the mole ratio of tungsten to zirconium in solution was about 4, thereby producing a precipitate wherein the corresponding ratio is about 3. The precipitate was filtered off and dried (without washing) at room temperature in air. This hydrous oxide ion exchanger is now partly in the hydrogen form and partly in the sodium form and can be converted into other forms by treatment with proper reagents, e.g., to substantially the ammonium form by treatment with 0.5 to 1 M $NH_4Cl$ solution, or to the hydrogen form by treatment with 0.5 M HCl or $HNO_3$.

It is to be noted that this particular ion exchanger was dried at essentially room temperature. With drying above 80° C. adsorptive capacity was greatly impaired and with drying above 150° C. adsorptive capacity essentially disappeared. However, heat treatment above 600° C. causes reappearance of some cation adsorption capacity, although considerably less than for the material dried at room temperature.

(b) In an alternate method for preparation, a relatively concentrated solution of sodium tungstate was passed through a column of hydrous zirconium oxide anion ion exchanger. The ion exchanger, after treatment with an excess of sodium tungstate, was a cation exchanger.

EXAMPLE 6

Hydrous thorium oxide ion exchanger

An excess of about 2 M $NH_4OH$ was added to about 1 M $ThCl_4$. The resultant gelatinous precipitate was filtered off, washed, dried, ground and sized.

EXAMPLE 7

Hydrous oxide ion exchanger containing oxides of thorium and phosphorus (a) $ThCl_4$ was dissolved in water, about 6 M $H_3PO_4$ was added thereto, and then $Na_3PO_4$ was added until pH ca. 4 was reached. The precipitate formed at this point was filtered off, washed and dried. This material showed essentially no cation adsorption properties; however, it did take up chromate ions, showing it was essentially an anion exchanger.

(b) To the filtrate obtained during the separation of the exchanger in 7(a) above, additional $Na_3PO_4$ was added until no more precipitate was formed. This precipitate was filtered off, washed and dried. The resultant ion exchanger did not take up chromate ions, but did adsorb considerable quantities of $Cs^+$ ion. This shows that by controlling the conditions of precipitation it is possible to obtain an ion exchanger which may be either a cation or anion exchanger.

EXAMPLE 8

Hydrous tin oxide ion exchanger

An excess of 1 M $NH_4OH$ was added with stirring to a 1 M solution of $SnCl_4$ and the resultant precipitate was filtered, washed with water, ground and sized.

EXAMPLE 9

Hydrous oxide ion exchanger containing oxides of bismuth and tin

While bismuth oxides and basic salts of Bi (III) adsorb various negative ions, they are not satisfactory ion exchangers since they tend to disperse into fine particles and tend to undergo phase changes which make column operation difficult. Many mixed oxides containing Bi(III) substantially retain the unusual ion exchange and adsorptive properties of Bi (III) oxides, but do not show the unattractive physical properties indicated above. Typical of various methods for preparing mixed oxides of this type is the preparation of a mixed Bi(III)-Sn(IV) hydrous oxide ion exchanger.

A suspension of freshly precipitated hydrous bismuth oxynitrate was treated in equimolar proportions with a solution of sodium stannate and acid was added to insure complete co-precipitation. The resultant precipitate was filtered off, washed, dried, ground and sized.

Similar preparations were made with different mole ratios of bismuth to tin.

EXAMPLE 10

Drying of hydrous oxides

The drying temperature, though of importance in determining the ion exchange capacities of ion exchangers, may or may not always be critical. However, most hydrous oxide ion exchangers usually exhibit higher ion exchange capacities when dried at relatively low temperatures rather than at temperatures which are sufficiently high to impair or destroy their hydrous character.

Table 1 summarizes the apparent capacities for chromate ion adsorption by hydrous zirconium oxide ion exchangers (Example 3) with various water contents resulting from drying for 16–24 hours at various temperatures. The chromate ion uptake was measured by passing 0.02 M Cr(VI) solutions in 0.1 M HCl through small columns (ca. 1 cc.) of the hydrous zirconium ion exchangers and determining the shape of the breakthrough curves.

TABLE 1.—EFFECT OF DRYING TEMPERATURE ON CHROMATE ION ADSORPTION

| Drying Temp., ° C. | Water content, wt. percent | Moles Cr (VI)/ kg. | Moles Cr (VI)/ liter |
|---|---|---|---|
| 32 | 46.4 | 1.38 | 0.853 |
| 105 | 19.4 | 1.25 | 1.118 |
| 202 | 15.4 | 0.91 | 0.866 |
| 320 | 7.0 | 0.45 | 0.471 |
| 500 | 1.1 | 0.14 | 0.182 |
| 800 | 1 0 | 0.05 | 0.065 |

[1] Assumed value.

The preparation of other single or mixed hydrous oxide ion exchangers may be carried out readily by the methods presented above for the preparation of zirconium oxide, thorium oxide and tin oxide exchangers.

The preparation of mixed hydrous oxide ion exchangers, where the respective oxides are derived from both the cation and anion in solution such as in the case of vanadates, niobates, tantalates, molybdates, tungstates, phosphates and arsenates, may be carried out by the methods shown above, either by co-precipitation or adsorption on a hydrous anion exchanger. In carrying out such methods the acidic oxide can contain an element selected from the group consisting of V(V), Mo(VI), W(VI) and As(V) and the basic oxide can contain an element selected from a group consisting of Ti(IV), Zr(IV), Th(IV), Sn(IV), Nb(V), Bi(III) and Ta(V).

Most of the hydrous oxide ion exchangers have been made using reagent grade chemicals in order to develop the characteristics of the ion exchangers with a minimum of ambiguity. It is now apparent that the presence of impurities normally found in commercial reagents does not have any serious deleterious effects as far as the preparation of most ion exchangers of this character is concerned.

Although gelatinous precipitates have been used generally, the form may be varied to yield ion exchangers with somewhat more attractive physical properties, such as gel beads. The precipitates may be formed on suitable insoluble supports and, as shown above, on some of the hydrous oxides themselves. Likewise, subsquent treatment of one hydrous ion exchanger may be used to change the ion exchanger type, e.g., addition of an excess of phosphoric acid to a hydrous zirconium oxide ion exchanger yields a cation exchanger similar to that obtained for the zirconium-phosphorus oxide exchanger prepared by conventional precipitation methods.

Some of the typical compounds tested for ion exchange properties are shown in Table 2.

TABLE 2.—TYPICAL HYDROUS OXIDE ION EXCHANGERS TESTED (1) Simple oxides:
  (a) Principally cation exchangers: Mo(VI) W(VI).
  (b) Principally anion exchanger: Bi(III).
  (c) Anion exchangers at high acidity; cation exchangers at low acidity or in basic solutions: Ti(IV), Zr(IV), Th(IV), Sn(IV), Nb(V), Ta(V), Cr(III), Fe(III), Al(III).

(2) Mixed oxides:
  (a) Principally anion exchangers: Bi(III)-Al(III), Bi(III) - Zr(IV), Bi(III) - Th(IV), Bi(III)-Sn(IV)—all with sufficient bismuth.
  (b) Anion exchangers at high acidity; cation exchangers at low acidity and in basic solutions: Fe(III)-Cr(III), Zr(IV)-Sn(IV).

(3) Mixed oxides—with one acidic oxide:
  All of these ion exchangers are cation exchangers when prepared in the presence of an excess of acidic oxide; however, they are anion exchangers (of type 1 (c) above) when prepared in the presence of excess of the basic oxide.
  Ti(IV)-W(VI), Zr(IV)-W(VI), Hf(IV)-W(VI), Th(IV)-W(VI)
  Zr(IV)-Mo(VI)
  Ti(IV)-P(V), Zr(IV)-P(V), Th(IV)-P(V), Bi(III)-P(V)
  Zr(IV)-As(V)
  Zr(IV)-Cr(VI), Bi(III)-Cr(VI)

A general description of the application of hydrous oxide ion exchangers to the field of ion separation, where separations imply concentration, isolation, purification and/or recovery, is given below for cation exchange, anion exchange and deionization (the combination of anion exchange and cation exchange).

(1) CATION EXCHANGE

For cation exchange in acidic solutions, a hydrous oxide ion exchanger containing at least one acidic component is desirable, such as insoluble hydrous oxides containing an oxide of tungsten, molybdenum, phosphorus and/or arsenic. Many of these latter hydrous oxides tend to lose their acid components in neutral or basic solutions (see also below under (2) Anion Exchange) and their use is thus restricted. Some loss of oxides of tungsten, molybdenum, etc., may also occur in extremely acid solutions, which implies some caution in their use under these conditions. It is often possible to avoid contamination by these acidic components of solutions under treatment by the addition of a section of a more basic hydrous oxide at the effluent side of the columns on which the acidic oxide readsorbs.

There appears to be a general trend in the relative selectivity of the hydrous oxides for various cations which depends on the acidity of the solutions and the concomitant degree of acid conversion of the hydrous oxide. The oxides containing acidic components were found to show a trend to higher selectivities between elements of a given charge type with higher acidity. They tend to lose this selectivity in the less acidic solutions where the oxides may exist principally in salt forms. This property affords a powerful means for altering the properties of the hydrous oxides to meet specific requirements. Indeed, it is possible in some cases to invert the selectivity by proper selection of oxides and conditions to separate certain cations A and B by:

(a) Eluting A first, then B;
(b) Eluting A and B together, in separating them from other ions;
(c) Eluting B first, then A.

The relative acidity of the hydrous oxides varies from element to element and for cation exchange in the less acidic or basic solutions the less acidic oxides could be selected. In basic solutions, the number of elements which remain soluble as cations becomes severely restricted, essentially to the alkali metals and the alkaline earth metals or to solutions of extremely low concentration of other elements.

A number of examples are given to illustrate the various features of cation exchange with hydrous oxide ion exchangers. While the separation and recovery of alkali and alkaline earth metal ions predominate in the examples, the separations and recoveries of various ions is not limited to these examples as they do not cover the whole breadth of the supporting experimental work. From such work it is apparent that hydrolyzable ions may be separated satisfactorily, that difficult separations, such as those for the rare earths, are possible, and that many unique isolations may be achieved.

EXAMPLE 11

Separation of alkali metals with hydrous Zr(IV)-W(VI) oxide ion exchanger

This ion exchanger (Example 5) was dried at 25° C. without washing, ground and screened to ca. 100 mesh, and prepared in a column 12.3 cm. high with 0.13 cm.$^2$ cross sectional area. A 0.01 M NH$_4$Cl solution containing Li$^+$, Na$^+$, K$^+$, Rb$^+$ and Cs$^+$ was passed through the column and the alkali metals adsorbed. Elution in the order Li, Na, K Rb and Cs was achieved by treating the column of enriched ion exchanger with NH$_4$Cl solutions of successively increasing concentration (0.05 M, 0.1 M, 0.3 M, 0.75 M and 4.5 M NH$_4$Cl). Each element came off in a sharp band with essentially symmetrically (Gaussian) shaped elution band. Half widths of the bands were less than 2 column volumes and essentially complete elution of each element was achieved with less than 6 column volumes of each reagent.

EXAMPLE 12

Separation of alkali metals with hydrous Zr(IV)-Mo(VI) oxide ion exchanger

The alkali metal ions Na$^+$, K$^+$, Rb$^+$ and Cs$^+$ were adsorbed from 0.01 M NH$_4$Cl solution onto a column of the ion exchanger 6 cm. high and 0.2 cm.$^2$ cross section. The ions were removed from the ion exchanger by successively raising the concentration of NH$_4$Cl eluent to 0.1 M for Na, to 0.5 M for K, to 1 M for Rb and to saturated NH$_4$Cl for Cs. All the alkali metal ions came off in bands of approximately Gaussian shape and of narrow half width (approximately 2 column volumes). Each elution band commenced within 2 column volumes after the eluent concentration was raised to the value specified above for it.

EXAMPLE 13

Separation of alkali metals with hydrous Zr(IV)-P(V) oxide ion exchanger

The alkali metal ions, Na$^+$ through Cs$^+$, were adsorbed from about 0.01 M NH$_4$Cl onto a column of the ion exchanger (previously dried at 25° C. and converted partially to the NH$_4$$^+$ form) 12.5 cm. high and 0.2 cm.$^2$ cross section. The adsorbed ions were successively removed (flow rate ca, 00.7 cm./minute) by successively raising the concentration of NH$_4$Cl eluent to 0.5 M for Na, 1.0 M for K, to 2.0 M for Rb and to saturated NH$_4$Cl for Cs. All the alkali metal ions came off in reasonably sharp bands, except the Cs$^+$ which showed some tailing.

EXAMPLE 14

Separation of alkaline earth metals with hydrous Zr(IV)-Mo(VI) oxide ion exchanger The alkaline earth metal ions Ca, Sr, Ba and Ra were absorbed from a solution 0.1 M in $NH_4Cl$ and 0.005 M in HCl onto a column of ion exchanger (previously dried at room temperature and partially in the $NH_4^+$ form) 10 cm. high and 0.2 cm.$^2$ cross section. The eluent concentration of 0.2 M $NH_4Cl$-0.005 M HCl was used to remove Ca which came off between 2 and 8 column volumes; the concentration raised to 0.5 M $NH_4Cl$-0.005 M HCl and Sr removed in between 1 to 4 column volumes; raised to 1.0 M $NH_4Cl$-0.005 M HCl with the removal of Ba beginning after passage of 3 column volumes and being complete in about 5 more column volumes; and finally the concentration was raised to saturated $NH_4Cl$-0.01 M HCl and the Ra removed in about 4 column volumes. The flow rate was about 1.1 cm./minute.

In other experiments, the alkaline earth metal ions Mg to Ba were adsorbed from 0.1 M $NH_4Cl$-0.005 M HCl. Elution of the Mg was achieved in less than 4 volumes with 0.2 M $NH_4Cl$-0.005 M HCl and Ca eluted as a band between 5 and 8 column volumes. Sr and Ba were eluted as described above.

EXAMPLE 15

Separation of $Cs^+$ and $Na^+$ with hydrous zirconium oxide ion exchanger

A mixture of $Na^+$ and $Cs^+$ tracers in neutral solution was passed through a 0.2 cm.$^2$ x 3.6 cm. column of ion exchanger which had been pretreated with 1 M KOH. On elution with 0.1 M KOH the $Cs^+$ elution peak came at ca. 1.3 column volumes. The $Cs^+$ was well separated from the $Na^+$ band which had its elution peak at 4.4 column volumes.

It is pointed out that here the $Cs^+$ was eluted first and before the $Na^+$, which is the reverse of the order of separation obtained in Examples 11, 12 and 13 above.

EXAMPLE 16

Concentration and isolation of individual alkali metal ions with hydrous Zr(IV)-P(V) oxide ion exchanger The ratios of adsorbabilities of successive alkali metals may be made so great by proper choice of ion exchanger and operating conditions that isolation of individual members of this group from relatively concentrated electrolyte solutions becomes possible.

(a) This is particularly easy for Cs where, among others, concentration and isolation from concentrated (13 M) LiCl containing 0.1 M HCl was carried out, and isolation from 1.9 M $Al(NO_3)_3$ was secured, using an acid washed hydrous Zr-P oxide ion exchanger.

Even concentration and isolation of metal ions occurring in low concentration is possible from an adjacent member (in high concentration) in the same column of the periodic table, e.g. K from Na, or Na from Li.

(b) A 0.001 M KCl solution in 0.1 M NaCl was passed through an acid washed hydrous Zr-P oxide ion exchanger column, 3.9 cm. x 0.28 cm.$^2$. A 50% breakthrough for K occurred after ca. 15 column volumes. Similar results were obtained with a LiCl solution containing Na tracer.

EXAMPLE 17

Separation of alkali and alkaline earth metal groups using hydrous Zr(IV)-P(V) oxide ion exchanger The metal ions in an aqueous solution containing 0.01 millimole of Na, K, Cs, Mg, Ca, Sr and Ba were adsorbed on a 2 cm. x 0.2 cm.$^2$ column of the ion exchanger, which had been previously dried at 25° C. and pretreated with sufficient ammonia to remove the hydrogen ions in the ion exchanger. The total loading of the column with alkali and alkaline earth metals was 0.28 equivalent per liter of adsorbent bed. The Na, K and Cs ions were removed from the enriched exchanger by elution with 1 M $NH_4Cl$, and the Mg, Ca, Sr and Ba retained thereon were subsequently removed by elution with 1 M HCl.

EXAMPLE 18

Separation of Cs(I) and Ba(II) with hydrous Zr(IV)-P(V) oxide ion exchanger

A mixture of Cs and Ba ions in about 0.01 M HCl was adsorbed onto a 3.1 x 0.2 cm.$^2$ column of ion exchanger, which had been previously dried at 25° C., pretreated with sufficient 1 M HCl to convert the column to the $H^+$ form, after which it was washed with a few volumes of water to remove interstitial HCl. Elution with 1 M HCl removed the Ba while the Cs remained adsorbed. Thereafter the Cs was removed with saturated $NH_4Cl$ solution. This separation was carried out at flow rates of several cm./minute with both elution bands sharp and essentially Gaussian in shape.

Attention is directed here to the fact that in this separation Ba was removed first, then the Cs. Had the separation been made from a salt solution and the ion exchanger been in salt form (Example 17), the order of elution would have been reversed. Comparison of these two examples thus illustrates the importance of control of acidity and of the composition of the ion exchanger in controlling the type of separation to be achieved.

EXAMPLE 19

Separation of Cs(I) and Ba(II) with hydrous Sn(IV) oxide ion exchanger

The ions in an aqueous solution containing Cs and Ba in 0.01 M HCl were adsorbed on the ion exchanger (dried at 25° C.) in a 1.7 cm. x 0.125 cm.$^2$ column, which had been pretreated with 0.5 M $NH_3$-0.5 M $NH_4NO_3$. Although these cations are not usually adsorbed by this adsorbent from acidic solutions, they were adsorbed in this case because there was enough acid-neutralizing-capacity in the washed ion exchanger to neutralize the excess acidity of the added aliquot. Cs was removed in a sharp band by elution with 0.5 M $NH_3$-0.5 M $NH_4NO_3$ and thereafter the Ba was removed with some tailing with 1 M $HNO_3$.

EXAMPLE 20

Separation of Cs(I), Ba(II) and Eu(III) with hydrous Zr(IV) oxide ion exchanger

The ions in a slightly acid aqueous solution containing Cs, Ba and Eu were adsorbed on the ion exchanger (dried at 500° C.) in a 2.0 cm. x 0.2 cm.$^2$ column which had been pretreated with 1 M NaOH and water washed. Elution of the enriched ion exchanger with 0.1 M $NH_3$-0.1 M $NH_4NO_3$ solution removed the Cs; thereafter elution with 10 M $NH_4NO_3$ removed the Ba; and finally the Eu was removed with 2 M $HNO_3$. All elution bands were sharp and essentially Gaussian.

In carrying out the above separation, Eu was selected as a typical rare earth, principally because a radioactive tracer was readily available. Other rare earths could, of course, have been used as well.

EXAMPLE 21

Separation of Co(II) and Fe(III) with hydrous Zr(IV)-W(VI) oxide ion exchanger

A dilute nitric acid solution containing Co and Fe was passed through the ion exchanger (dried at room temperature) in a 5 cm. x 0.1 cm.$^2$ column. On elution of the enriched ion exchanger with 0.1 M $HNO_3$-0.5 M $KNO_3$, Co began to come through at about 2 column volumes and was essentially completely eluted after the passage of 6–7 column volumes. Thereafter, on elution with 0.1 M HCl-8 M LiCl, the Fe began to come off after passage of about 6 column volumes and was essentially completely eluted by the time 12 more column volumes had passed through. The flow rate was 0.5 cm./minute.

EXAMPLE 22

Separation of copper from ammonia solution with hydrous Zr(IV) oxide ion exchanger A 0.01 M solution of copper chloride in 1 M $NH_3$ was passed into a small column of exchanger (dried at 100° C.). The copper adsorbed as a dark blue band with a sharp frontal edge. The color of the adsorbed Cu indicated that an ammonia complex was adsorbed. After passage of 10 cc. of the solution into the column, only 0.25 cc. of the column was loaded, i.e., the average concentration in the ion exchanger was approximately 0.4 mole/Cu/liter of adsorbent bed. Elution of most of the adsorbed Cu was achieved by elution with 1 M $NH_4Cl$; in other experiments elution was carried out with 0.5 M HCl.

(2) ANION EXCHANGE

All except the most acidic hydrous oxides appear to be anion exchangers in acidic solutions. The anion exchange capacity in general tends to decrease with increasing pH and is also dependent on the type of anion which is being adsorbed. To some extent it is also determined by the cations present in solution since, parallel with the adsorption of anions, cation adsorption may also take place. Indeed, such adsorption of anions on hydrous oxides, which leads to cation adsorption, is one of the methods by which cation exchangers, as discussed above, can be made.

The selectivity of the hydrous oxide anion-exchangers is remarkably great when compared with typical organic exchangers, particularly for certain polyvalent anions. The selectivity of these exchangers seems related, in many cases, to the complexing properties of the metal on which it is based. Many of these exchangers show remarkable selectivity for fluoride ion in concordance with the strong complexing tendencies of the metals from which they are formed. The hydrous oxides based on metals on the left side of the periodic table (e.g., Group IV–A, the titanium group) have little selectivity for other halide ions, while those based on metals with strong complexing properties, such as Bi(III), have remarkable chloride selectivity. Similar selectivity for many other anions, such as sulfide, cyanide, selenide, etc., may be obtained by proper selection of the hydrous oxide element components.

While adsorption or admixture of an acidic oxide may destroy the anion exchange properties of a given hydrous oxide and convert it into a cation exchanger, this becomes serious only when such admixtures are very large (addition of a considerable excess). If the addition is moderate, considerable benefits may be obtained in making the hydrous oxide loss dispersible than it would be otherwise. In some cases the admixture of acidic oxides may be as large as mole for mole without destroying the anion exchange properties.

EXAMPLE 23

Separation of Cr(VI) with hydrous Zr(IV) oxide ion exchanger

A large number of experiments were made on the adsorption of Cr(VI) from various electrolyte solutions (acid, neutral salt and ordinary river water). The hydrous zirconium oxide ion exchanger (dried at 200° C.) was placed in small columns (approximately 1 cc. in volume and ca. 2 cm. high), and the Cr(VI) adsorbed thereon, and thereafter eluted with 1 M $NH_3$ or 1 M NaOH to remove Cr(VI). The effluent in the regeneration step contained more than 90% of the Cr(VI) in the form of neutral salts [$(NH_4)_2CrO_4$ or $Na_2CrO_4$] with practically no contamination by base.

A small amount of Cr(VI) is often retained by the ion exchanger after regeneration with 1 M NaOH, as revealed by the slight yellow cast of the regenerated column. Much of this residual Cr(VI) can be removed by prolonged treatment with strong base; however, this is rarely necessary since this small amount of Cr(VI) does not affect significantly the performance of the columns in subsequent cycles.

(a) From 0.02 M Cr(VI) in 1 M $HNO_3$, 0.1 M $HNO_3$, 1 M HCl or 0.1 M HCl, the chromate uptake was between 0.5 and 0.9 mole/liter of adsorbent bed at the 50% breakthrough point. In most of these experiments the ion exchanger was pretreated with the corresponding acid (salt form exchanger) but essentially identical results were obtained with ion exchanger pretreated with base (hydroxide form exchanger) provided the excess acidity of the solution was large.

Adsorption of Cr(VI) from 1 M or 0.1 M $H_2SO_4$ was considerably lower (0.01 and 0.035 mole/liter of ion exchanger bed, respectively) reflecting the high selectivity of the ion exchanger for sulfate and particularly bisulfate ions.

Cr(VI) has been adsorbed from electrolyte solutions containing only 2 moles of hydrogen ions per mole of chromate; i.e., from chromic acid solutions; with the adsorbent initially in substantially the hydroxide form. In this case, sufficient acid was present to neutralize the hydroxide ions released by the exchange, provided no excess base had been adsorbed by the ion exchanger during pretreatment or regeneration. Since the hydrous oxide ion exchangers tend to adsorb more NaOH than $NH_3$ when treated with these bases, successful adsorption on a NaOH regenerated ion exchanger requires the presence of some excess acid in the chromate solution while essentially no excess acid is required after regeneration with $NH_3$.

(b) From 0.02 M Cr(VI) in 1 M $NaNO_3$, 0.1 M $NaNO_3$, 1 M NaCl or 0.1 M NaCl, the Cr(VI) uptake was about 0.4 mole/liter of ion exchanger bed at 50% breakthrough. The ion exchanger had been pretreated with $HNO_3$ and HCl respectively, for the nitrate and chloride adsorptions. If the ion exchanger had not been changed to the salt form by previous acid treatment, adsorption of Cr(VI) from the neutral salt solutions would have been very poor; i.e., the hydroxide form of exchanger should not be used for adsorption of Cr(VI) from neutral salt solutions.

The success of adsorption of Cr(VI) from sulfate solutions depends largely on the pretreatment of the ion exchanger. While a considerable amount of adsorption of Cr(VI) occurs when the ion exchanger is pretreated with $H_2SO_4$, a double S shape of the breakthrough curve prevents full utilization of the capacity of the ion exchanger. This difficulty may be avoided by pretreatment of the ion exchanger with HCl or $HNO_3$ instead of $H_2SO_4$, or by treating it with $HNO_3$ and converting the resultant nitrate form to the sulfate form by treatment with a sulfate solution.

(c) A typical example is given for recovery of Cr(VI) from river water illustrating not only the recovery of valuable metals but also stream pollution control. The water used contained approximately 200 p.p.m. Cr(VI), 520 p.p.m. $SO_4^{--}$, 140 p.p.m. $Ca^{++}$, 90 p.p.m. $Cl^-$ and 70 p.p.m. $PO_4^{---}$. About 100 mesh hydrous Zr(IV) oxide (dried at 200° C.) was used in a column (1 cm. x 0.2 cm.²) in the nitrate form, as a result of pretreatment with 1 M $HNO_3$, with a water flow rate of 3 cm./minute. Approximately 300 column volumes were passed through the ion exchanger before the effluent contained Cr(VI) at one-half the entering concentration (50% breakthrough). The column was then washed with small portions of 1 M $HNO_3$ and water to remove accumulated gelatinous hydroxides and adsorbed cations. Cr(VI) was removed with 1 M NaOH. The column was again treated with acid and the process repeated. In the second cycle, 265 column volumes were passed through to the 50% breakthrough point; this decreased to 260 column volumes in the third and fourth cycles, and further decreased to 250 column volumes in the fifth, sixth and seventh cycles. In all cycles elution of Cr(VI) with 1 M NaOH was ca. 96% completed in the first ca. 5 column volumes.

EXAMPLE 24

Separation and recovery of elements in anionic form with hydrous Zr(IV) oxide ion exchanger Since the hydrous zirconium oxide ion exchangers are particularly selective for polyvalent anions, they may be used for the separation and recovery of elements which may normally occur as soluble acids or soluble anions, e.g., antimonates, arsenates, borates, molybdates, selenates, tellurates, tungstates, vanadates, etc. Separation and recovery of certain members of this class has been performed using hydrous zirconium oxide ion exchanger (dried at 200° C.) in columns (approximately 1 cm. x 0.2 cm.²). Elution of the elements from the column of ion exchanger was carried out with 1 M NaOH and the efficiency of removal in all cases was in excess of 90% within the first few column volumes.

The results of a number of typical separations are summarized in Table 3, wherein is listed, the type of acid or ion used, its concentration and the medium from which the adsorption was made, the reagent used for the pretreatment of the ion exchanger and the uptake of element being separated in moles per liter of ion exchanger bed when 50% breakthrough occurred.

TABLE 4.—ADSORPTION OF SOME METAL ANIONS ON GROUP IV HYDROUS OXIDE ION EXCHANGERS

| Hydrous Oxide | Medium | Distribution Coefficient for— | | |
|---|---|---|---|---|
| | | Cr (VI) | Mo (VI) | W (VI) |
| $TiO_2$ | 1 M $Na_2CO_3$ | 1.0 | <0.5 | 15 |
| $TiO_2$ | 1 M $NaHCO_3$ | <0.5 | 0.5 | 1,000 |
| $TiO_2$ | 1 M $NH_3$-1 M $NH_4Cl$ | 3 | 2 | 2,000 |
| $TiO_2$ | 1 M HOAc-1 M NaOAc | 40 | 3,000 | 200 |
| $TiO_2$ | 1 M NaOAc | 10 | 70 | 2,000 |
| $ZrO_2$ | 1 M $Na_2CO_3$ | 1.5 | 5 | 20 |
| $ZrO_2$ | 1 M $NaHCO_3$ | 1.4 | 4 | 200 |
| $ZrO_2$ | 1 M $NH_3$-1 M $NH_4Cl$ | 60 | 100 | 1,000 |
| $ZrO_2$ | 1 M HOAc-1 M NaOAc | 3,000 | >3,000 | 100 |
| $ZrO_2$ | 1 M NaOAc | 700 | 1,000 | 1,500 |
| $ThO_2$ | 1 M $Na_2CO_3$ | 0.5 | <0.5 | <0.5 |
| $ThO_2$ | 1 M $NaHCO_3$ | 0.5 | <0.5 | 2 |
| $ThO_2$ | 1 M $NH_3$-1 M $NH_4Cl$ | 2,000 | 1,000 | 3,000 |
| $ThO_2$ | 1 M NaOAc | 1,000 | 1,000 | 5,000 |
| $SnO_2$ | 1 M $Na_2CO_3$ | 1.0 | <0.5 | 1.0 |
| $SnO_2$ | 1 M $NaHCO_3$ | <0.5 | <0.5 | 200 |
| $SnO_2$ | 1 M $NH_3$-1 M $NH_4Cl$ | <0.5 | <0.5 | 50 |
| $SnO_2$ | 1 M HOAc-1 M NaOAc | 25 | 3,000 | 200 |
| $SnO_2$ | 1 M NaOAc | 1.5 | 1 | 1,000 |

EXAMPLE 26

Separation of Cr(VI) and phosphate with hydrous Ti(IV) oxide ion exchanger

The Cr(VI) and phosphate in an aqueous solution

TABLE 3.—ADSORPTION OF SOME POLYVALENT METAL ANIONS BY HYDROUS ZIRCONIUM OXIDE ION EXCHANGER

| Acid or Ion | Concentration, M | Medium | Uptake [1] | Pretreatment |
|---|---|---|---|---|
| $H_3BO_3$ | 0.02 | 0.1 M $NaNO_3$ | 0.64 | $NH_3$ |
| $H_3BO_3$ | 0.02 | 0.1 M $NaNO_3$ | 0.22 | $HNO_3$ |
| Mo (VI) | 0.1 | 0.2 M $NaNO_3$, pH 1.4 ($HNO_3$) | 1.48 | $HNO_3$ |
| Mo (VI) | 0.1 | 0.4 M $NaNO_3$, pH 6.7 | 0.41 | $HNO_3$ |
| Mo (VI) | 0.1 | 0.4 M $Na_2SO_4$, pH 6.6 | 0.81 | $H_2SO_4$ |
| W (VI) | 0.1 | 0.2 M $NaNO_2$, pH 1.8 ($HNO_3$) | 1.30 | $HNO_3$ |
| W (VI) | 0.1 | 0.4 M $NaNO_2$, pH 9.1 | 0.47 | $HNO_3$ |
| W (VI) | 0.1 | 0.2 M $Na_2SO_4$, pH 1.9 ($H_2SO_4$) | 0.08 | $H_2SO_4$ |
| W (VI) | 0.1 | 0.4 M NaCl | 0.61 | HCl |
| As (V) | 0.1 | 0.4 M $NaNO_3$, pH 1.7 | 1.60 | $HNO_3$ |
| As (V) | 0.086 | 0.48 M $NaNO_3$, pH 7.0 | 0.99 | $HNO_3$ |
| As (V) | 0.1 | 0.4 M $Na_2SO_4$, pH 7.2 | 1.13 | $H_2SO_4$ |
| As (III) | 0.1 | 0.4 M $NaNO_3$, pH 2.0 | 1.58 | $HNO_3$ |

[1] Moles per liter of ion exchanger bed at 50% breakthrough.

EXAMPLE 25

Hydrous oxide ion exchangers and aqueous medium for anion separation

As pointed out above, the adsorbability of a given anion from an aqueous solution of a given pH or for a given medium varies from one hydrous oxide ion exchanger to another. At low acidity or in basic solutions the adsorbability appears to be related to what is commonly known as the acidity or basicity of the oxide. The adsorbability of the anions is, of course, also determined by the selectivity of the ion exchanger for other anions present or used for elution. In Examples 23 and 24, only $NH_3$ and NaOH were discussed as eluents for the recovery of adsorbed anions but, of course, other strong bases act similarly to NaOH.

Table 4 shows a summary of a considerable number of experiments involving the separation of Group VI anions, Cr, Mo, and W, with Group IV hydrous oxide ion exchangers, Ti, Zr, Th and Sn. The medium from which the respective anions are adsorbed is shown, together with the distribution coefficients using trace amounts of chromate, molybdate and tungsten. These distribution coefficients are the ratio of the concentration of the element in the ion exchanger phase to its concentration in the aqueous phase. This distribution coefficient is closely related to the number of column volumes which can be processed before 50% breakthrough occurs under conditions where loading of the ion exchanger with respect to these ions is small. They are also closely related to the number of column volumes necessary to elute a thin adsorption band.

were adsorbed on the ion exchanger in a column (2.8 cm. x 0.13 cm.²), which had been pretreated with base and water washed. The Cr(VI) was eluted immediately with 0.1 M NaOH and thereafter the phosphate was eluted with 1 M NaOH.

EXAMPLE 27

Separation of Ag(I) and Au(III) in chloride solution with hydrous Zr(IV) oxide ion exchanger A mixture of Au(III) and Ag(I) tracers in 1 M HCl (containing some chlorine) was contacted with the ion exchanger (dried at 200° C.) in a column (3.6 cm. x 0.28 cm.²). The adsorbed metals were selectively eluted with 2 M HCl (containing chlorine) at a flow rate of approximately 0.5 cm./minute. Au(III) had an elution peak at approximately 1 column volume and the Ag(I) at approximately 4 column volumes.

This example illustrates the fact that these inorganic anion ion exchangers may be used for separation of negatively charged metal complexes.

(3) DEIONIZATION (COMBINATION OF ANION AND CATION EXCHANGE)

Salt removal and deionization may be achieved with inorganic adsorbents in essentially the same way as is conventional with organic exchangers, i.e. by *combined* use of anion and cation ion exchangers. However, the hydrous oxide ion exchangers appear to have some additional properties which are not available in the organic ion exchangers. They can, under proper conditions, adsorb *both* anions and cations on the same oxide exchanger. Three classes of this behavior are distinguished:

(a) Anion exchange capacity of many hydrous oxide ion exchangers overlaps with cation exchange capacity. In general, one greatly outweighs the other, but for a given pair of ions to be adsorbed, there is usually a pH at which both adsorb equally well, i.e., where salt pickup reaches a maximum.

(b) Some adsorbed anions may carry along (by adsorption) the associated cations.

(c) Adsorption of acids ($H^+$ and anion) or bases ($OH^-$ and cation) in a manner typical of weakly basic and weakly acid organic exchangers.

Regeneration of such hydrous oxide ion exchangers which adsorb both cations and anions may be achieved in various ways, a typical one being successive washing with acid (to remove cations) and then with base (to remove anions), being careful to end up with a condition where no excess base remains adsorbed.

When used in the claims, the term "non-siliceous" is intended to exclude silicates but not to exclude silicates in admixture with the other claimed constituents of the ion exchanger in an amount so small that the ion exchange characteristics of the ion exchanger will not be significantly affected. It is not intended by the use of such term to exclude the use of the claimed ion exchanger for the separation of silicates from an aqueous solution containing them.

When used in the claims, the term "acidic" hydrous oxide is to be construed to embrace a hydrous oxide which tends to retain an attached negative charge, viz., to exhibit cation exchange properties, in the presence of the solutions and other hydrous oxides into which it is placed in contact; the term "basic" hydrous oxide is to be construed to embracce a hydrous oxide which tends to retain an attached positive charge, viz., to exhibit anion exchange properties, in the presence of the solutions and other hydrous oxides into which it is placed in contact.

What is claimed and desired to be secured by United States Letters Patent is:

1. A method of preparing a water insoluble, non-siliceous hydrous oxide cation exchanger containing at least one basic hydrous oxide containing an element selected from the group consisting of Ti(IV), Zr(IV), Th(IV), Sn(IV), Nb(V), Bi(III) and Ta(V) and at one non-siliceous acidic hydrous oxide containing an element selected from the group consisting of V(V), Mo(VI), W(VI) and AS(V), at least one of said hydrous oxides containing an element with atomic number greater than 20, which comprises: co-precipitating a water soluble compound of the basic oxide with a water soluble compound of the acidic oxide; the pH of the mixed solution and the proportion of the solutes being such as to result in a sufficient excess of the acidic oxide in the resulting co-precipitate to impart to it cation exchange properties.

2. A method of preparing a water insoluble, non-siliceous hydrous oxide cation exchanger containing at least one basic hydrous oxide containing an element selected from the group consisting of Ti(IV), Zr(IV), Th(IV), Sn(IV), Nb(V), Bi(III) and Ta(V) and at least one non-siliceous acidic hydrous oxide containing an element selected from the group consisting of V(V), Mo(VI), W(VI) and As(V), at least one of said hydrous oxides containing an element with atomic number greater than 20, which comprises: contacting a solution containing said acidic component in water soluble form with said basic component in solid form for a sufficient amount of time to permit said acidic component to be absorbed on said solid basic component in sufficient excess so that the resulting material has effective cation exchange properties.

3. A method of preparing a hydrous mixed oxide which is particularly adapted for use as a cation exchanger, said mixed oxide containing oxides of zirconium and phosphorous, the oxide of phosphorous being present in sufficient excess to impart effective cation exchange properties to said mixed oxide, comprising drying said hydrous mixed oxide at a temperature of less than approximately 300° C.

4. The product of the method defined in claim 3.

5. A method of preparing a hydrous mixed oxide which is particularly adapted for use as cation exchanger, said mixed oxide containing oxides of zirconium and tungsten, the oxide of tungsten being present in sufficient excess to impart effective cation exchange properties to said mixed oxide, comprising drying said hydrous mixed oxide at a temperature of less than approximately 80° C.

6. The product of the method defined in claim 5.

References Cited

UNITED STATES PATENTS

| | | | |
|---|---|---|---|
| 2,943,059 | 6/1960 | Beck et al. | 252—179 |
| 3,002,932 | 10/1961 | Duwell et al. | 252—179 |

MAYER WEINBLATT, Primary Examiner

I. GLUCK, Assistant Examiner

PO-1050
(5/69)

UNITED STATES PATENT OFFICE
CERTIFICATE OF CORRECTION

Patent No. 3,522,187              Dated July 28, 1970

Inventor(s)  Kurt A. Kraus

It is certified that error appears in the above-identified patent and that said Letters Patent are hereby corrected as shown below:

Column 1, line 56, change "bone char" to --bon char--.
Column 13, Table 3, Line 34, change "0.2 M $NaNO_2$"
          to --0.2 M $NaNO_3$--.
Column 13, Table 3, Line 36, change "0.4 M $NaNO_2$"
          to --0.4 M $NaNO_3$--.
Column 15, line 46, insert --least-- after " and at".

Signed and sealed this 23rd day of March 1971.

(SEAL)
Attest:

EDWARD M. FLETCHER, JR.              WILLIAM E. SCHUYLER, JR.
Attesting Officer                    Commissioner of Patents